April 7, 1959 J. W. GRATIAN 2,881,263

REPRODUCING MEANS FOR MAGNETIC RECORDING APPARATUS

Filed Jan. 11, 1954 3 Sheets-Sheet 1

INVENTOR.
JOSEPH W. GRATIAN
BY T. L. Bowes
ATTORNEY

INVENTOR.
JOSEPH W. GRATIAN
BY T. L. Bowes
ATTORNEY

April 7, 1959 J. W. GRATIAN 2,881,263

REPRODUCING MEANS FOR MAGNETIC RECORDING APPARATUS

Filed Jan. 11, 1954 3 Sheets-Sheet 3

INVENTOR.
JOSEPH W. GRATIAN

BY T. L. Bowes
ATTORNEY

United States Patent Office 2,881,263
Patented Apr. 7, 1959

2,881,263

REPRODUCING MEANS FOR MAGNETIC RECORDING APPARATUS

Joseph W. Gratian, Rochester, N.Y., assignor, by mesne assignments, to General Dynamics Corporation, a corporation of Delaware Application January 11, 1954, Serial No. 403,129

13 Claims. (Cl. 179—100.2)

This invention relates to magnetic recording apparatus and more particularly to heads for reproducing signals from a medium carrying both perpendicularly and longitudinally recorded signals.

Magnetic recording systems have heretofore employed several different methods of recording intelligence on magnetic media. The most commonly used method is known as longitudinal recording in which the magnetic medium is moved through a field established at a gap across the surface of the recording head in such a way that the medium moves parallel to the lines of flux constituting the magnetic field at the gap, but transverse recording (in which the lines of force constituting the field through which the medium passes lie at right angles to the direction of movement of the medium and generally in the same plane as the medium) and perpendicular recording (in which the lines of force constituting the magnetic field are generally perpendicular to the plane of the medium) have also been utilized.

Perpendicular recording is advantageous in the low frequency response range but is characterized by relatively poor high frequency response characteristics because the recording and reproducing or play-back gaps are necessarily longer than those which can be provided in ring type heads commonly used for longitudinal recording. Conversely, longitudinal recording is of greatest utility in the high frequency response region, but is relatively deficient in the low frequency band.

For example, the use of perpendicular recording in combination with a cathode ray tube pick-up permits response to substantially zero frequency. Magnetic reproducing means of this type are shown, described, and claimed in the co-pending application of Norman Cole and myself, Serial No. 335,502, filed February 6, 1953, and assigned to the same assignee as the present invention. Recording heads have been developed for making combination recordings, particularly in the form of multi-track recordings on a single tape, one of the recordings being made according to one method of recording as, for example, longitudinal, and the other track being provided with a recording made according to a different method, as for example, perpendicular recording. Such heads are disclosed, described and claimed in co-pending applications of William B. Latchford and myself, Serial No. 403,127, filed January 11, 1954, and my co-pending application Serial No. 403,128, filed January 11, 1954, now Patent No. 2,850,581, dated September 2, 1958, both being assigned to the same assignee as the present invention.

One of the most important applications requiring response to zero cycles per second is in data recording. In such cases, extremely uniform frequency response and minimum phase distortion is desired in order to preserve complex wave forms. In the past, complex and expensive frequency modulation carrier systems have been used to accomplish this purpose. In some applications, response which is flat within (+) or (—) 0.2 db is needed. In order to provide smoother response using combination recording, and without resorting to the more expensive frequency modulation system, it has been proposed to use perpendicularly recorded signals which are to be recorded and reproduced through a low-pass filter network which, for example, may comprise a series resistor and a shunt capacitor across the input to a recorder. When reproduced by a perpendicular recording section of a combination reproducing head, these signals will provide a response curve which, to some degree, complements the response curve of the perpendicular recording section or head and the response is combined to provide a fairly flat over-all response. The resulting response range is superior to that obtained by conventional techniques and would be satisfactory in any application requiring wide range frequency response but permitting considerable phase distortion. However, in data recording where it may be necessary to preserve a complex wave form, such as a square wave, for example, very little if any phase distortion can be tolerated. This may be appreciated from the fact that a phase error of 2° at the fundamental frequency of a square wave will produce a 10% slope in the horizontal portion of the wave form (see F. E. Terman, "Radio Engineers Handbook," first ed., page 969). The system using the low-pass network described above would be of little use in this application since the network introduces phase shift of approximately 60° at the cross-over frequency. As is well known, the design and construction of networks which will correct for phase distortion without also altering the amplitude characteristic of the system is difficult and, in some cases, electrical networks may be required which are too complex to be of practical value.

Another serious disadvantage of the electrical filters and equalizers discussed above is that they produce a given result only at one tape speed. In some cases, for example, the high frequency response which is achieved with a high tape speed is unnecessary and in order to use as little recording medium as necessary, it is then desired to operate at a lower tape speed. If the tape speed is reduced, the cross-over frequency must also be reduced and a new set of filters and equalizers are required.

It would seem most desirable then for the critical applications to provide a combination core structure in which the high frequency cutoff of the perpendicular section, as well as the low frequency cutoff of the longitudinal section, is controlled by the configurations of the respective pickup core structures. I have found that this may be done without introducing the phase distortion which is characteristic of electrical filters and furthermore, since the cutoffs are a function of signal wavelength rather than frequency, tape speed may be altered without affecting the frequency response in the cross-over region.

Accordingly, it is an object of my present invention to provide a new and improved reproducing head for use in magnetic recording systems.

It is another object of my invention to provide a new and improved reproducing head for use in magnetic recording systems which includes means for reproducing recordings made by a plurality of methods of recording.

Still another object of my invention is to provide a combination reproducing head for use in magnetic recording systems which provides an improved frequency response.

In carrying out the principles of my present invention there is provided a reproducing head comprising two sections. The first section is designed to respond efficiently to signals recorded longitudinally on a medium which is transported through or across the head, such as a tape having side by side i.e., two track, recordings, one recording being longitudinal and the other perpendicular. The second section is designed to respond most efficiently to a perpendicularly recorded track or record. The pole pieces of the perpendicular section are provided with relativley long wing members. The over-all frequency response, particularly at the cross-over frequency region, may be adjusted by varying the spacing between and the contour of the wing members. In the illustrated form of my invention, these sections are designed to induce maximum flux in a cathode ray pick-up tube and the sections are also designed to provide a smooth cross-over in the frequency bands reproduced by the two sections. The foregoing arrangement, described in detail hereinafter, results in the reproduction of signals or intelligence having useful signal strengths over a frequency band extending from approximately zero to many thousands of cycles.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 discloses a reproducing head made in accordance with the principles of my invention as applied to a cathode ray pick-up tube.

Figure 1:
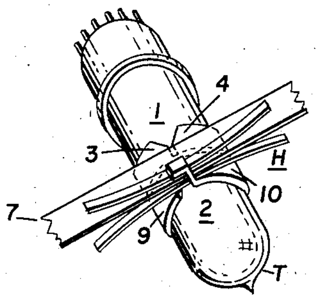
Figure 2:
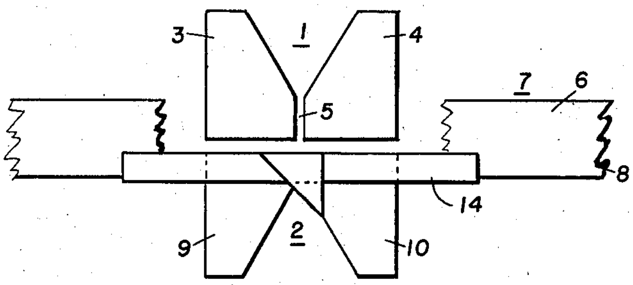
Figs. 2 and 3 illustrate details of the magnetic reproducing head shown in Fig. 1.
Figure 3:
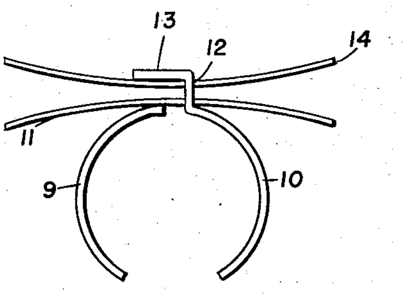

Referring to the embodiment of my invention illustrated in Figs. 1 to 3, inclusive, there is shown a combined reproducing head H associated with a cathode ray tube T designed to reproduce both longitudinally and perpendicularly recorded signals. Thus the assembly shown in Fig. 1 is provided with a first section 1 designed to reproduce longitudinally recorded signals and a second section 2 designed to reproduce perpendicularly recorded signals. Section 1 comprises two C-shaped portions or members 3 and 4 in the form of strip laminations arranged to engage closely the envelope of tube T in any suitable manner, not shown. Portions 3 and 4 are preferably tapered to provide a gap 5 at the narrow end of the portions 3 and 4 of sufficient width to cover portion 6 of tape 7 upon which longitudinally recorded signals are carried. The skirt portions of portions 3 and 4 provide a sufficiently large area to enable the transfer of a sufficient amount of flux to the elements of cathode ray tube T as described in detail hereinafter to enable the reproduction of the sound signals recorded on the tape.

The second section 2 is designed to reproduce signals perpendicularly recorded on portion 8 of tape 6 and comprises C-shaped sections 9 and 10 arranged to closely engage the envelope of tube T. Portions 9 and 10 are tapered in a manner similar to portions 3 and 4 of section 1.

Section 2 is provided with a relatively narrow but relatively long wing or member 11 of magnetic material which may be secured in any suitable manner to portion 9. Section 10 is provided at the pole end with a portion 12 extending away from the tube T and a portion 13 extending substantially parallel to and spaced apart from wing or member 11. Portion 13 carries a generally curved wing or member 14 of magnetic material corresponding to member 11. Any suitable means may be employed for conducting the medium or tape 7 longitudinally between wings or members 11 and 14. It will be noted that members 11 and 14 are curved away from each other and tape 7.

Section 1 is essentially a ring type pick-up employing a single lamination and section 2 is a perpendicular type pick-up having a gap 20 whose length is substantially perpendicular to the length of gap 5. The longitudinal section 1 responds to signals having recorded wave lengths between a fraction of a mil and several inches while the perpendicular section 2 is designed to respond to signals having recorded wave lengths between several tenths of an inch and infinity. Cross over from perpendicular to longitudinal pick-up depends upon the design of the magnetic structure. Electrical cross over networks and accompanying phase distortion problems are eliminated.

Figure 8:
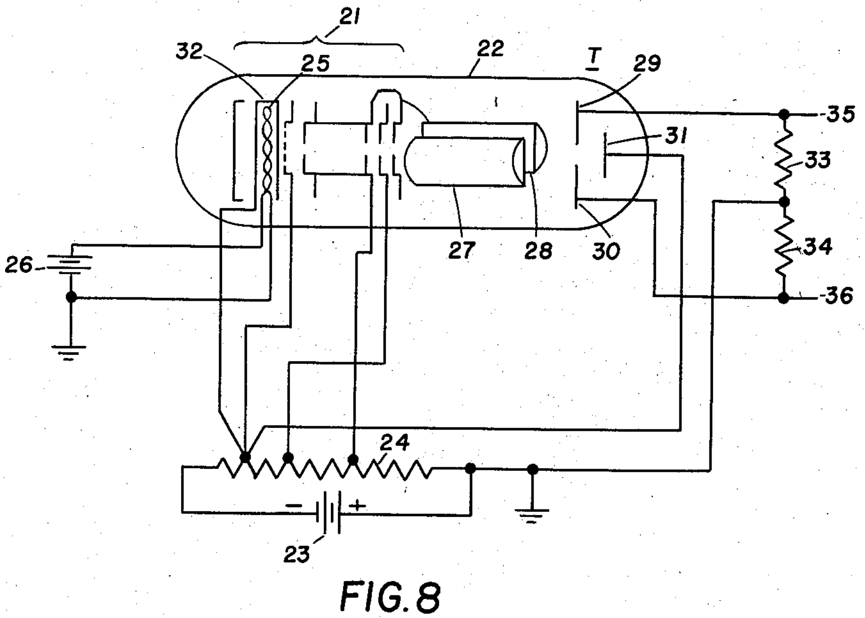
Fig. 8 is a schematic circuit diagram helpful in explaining the illustrated embodiments of my invention.

Referring to Fig. 8, there is shown representative details of the internal arrangement of the parts in cathode ray tube 1 and suitable electrical circuits for converting magnetic energy introduced into the tube from sections 1 and 2 into electrical energy for translation into sound. A cathode ray electron gun 21 is enclosed at one end of an envelope 22 which may be of glass or other suitable material. The various elements of the electron gun are supplied with appropriate voltages, according to techniques well-known to those skilled in the art, from battery 23 and voltage divider 24. The heater 25 of the electron gun may be supplied with energy from a suitable battery or other source of potential 26. The electron beam formed in gun 21 has a relatively broad diameter.

A pair of magnetic pole pieces 27 and 28 are located for the deflection of the beam emerging from electron gun 21. This beam may be deflected up or down by creating a magnetic field between pole pieces 27 and 28. These pole pieces are preferably made of a low retentivity, high permeability magnetic material. Consequently, a field may be set up between pole pieces 27 and 28 by establishing a magnetic field outside the envelope 22. In the illustrative forms of my invention the external means for establishing the magnetic field comprise sections 1 and 2.

When no field is present between pole pieces 27 and 28 (a condition which exists when magnetic fields are absent in gaps 5 and 20) the electron beam passes down the center of envelope 22. Some electrons strike collector plate 29 and an equal quantity strike collector plate 30. Those electrons which strike neither plate pass through the space between plates 29 and 30 and fall on plate 31 which is connected to the same potential as cathode 32 of the electron gun.

When a magnetic field is applied outside the tube envelope 22 to produce a field between magnetic pole pieces 27 and 28, the electron beam is deflected either up or down, depending upon the direction of the lines of flux of the field. If a deflection is up, more electrons are collected on plate 29 than on plate 30. If the beam is deflected down, the opposite condition obtains.

The electrons collected by plates 29 and 30 are returned to gun potential through resistors 33 and 34. From the foregoing explanation it is apparent that the voltages developed across resistors 33 and 34 and which therefore appear at terminals A and B respectively, as a result of the electron pull, are push-pull in nature, and may be utilized or amplified by any well-known means, such as a vacuum tube amplifier. Neither the amplification means nor utilization device has been illustrated, because the nature of such means depends upon the application of the magnetic recording apparatus, and in any event is well-known to those skilled in the art.

From the foregoing discussion it will be understood that signals recorded on track 6 of tape 7 induce flux in section 1 of my reproducing head and signals carried by portion 8 of magnetic medium 7 cause variations of flux in gap 20 of section 2. The variations in flux in gaps 5 and 20 are, of course, transferred to cathode ray gun 21 to effect a variation in the field between pole pieces 27 and 28 of cathode ray tube T. There results variation in electrical output between terminals 35 and 36 which, after amplification, may be reproduced as by means of a loudspeaker, for example.

Figure 4:
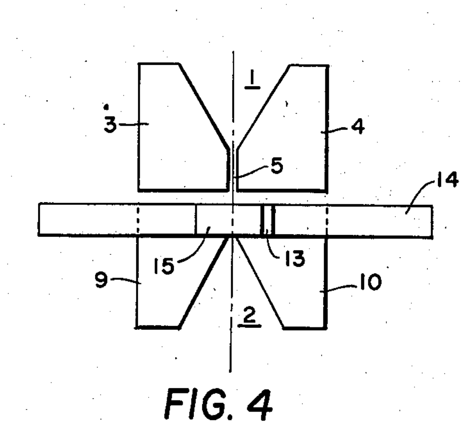
Figs. 4 and 5 illustrate a second embodiment of my invention as disclosed in Figs. 1 through 3 inclusive.
Figure 5:
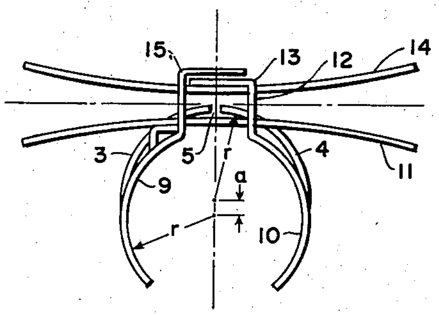

In Figs. 4 and 5 there is illustrated a second embodiment of my invention. The upper pole element 13 of perpendicular reproducing section 2 may have have associated with it a shunt member 15 which may be in the form of an extension of C-shaped member 9 of section 2 spaced from and parallel to element 13 and wing 14. A magnetic shunt is thus provided and the upper plate comprising the shunt may be distorted or bent to change the reluctance between the two portions 9 and 10 of the perpendicular pick-up and thus equalize the sensitivities of the perpendicular and longitudinal sections.

Figure 6:
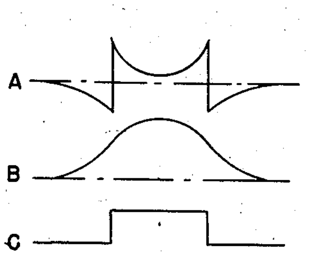

The manner in which the perpendicular and longitudinal sections respond to a signal having components in the cross-over region is indicated by the parts of Fig. 6. The recorded signal is assumed to be a uni-directional pulse such as indicated in Fig. 6C whose length is appreciably greater than the diameter of the ring section 1 of the pick-up. A typical pulse response of the ring section is indicated in Fig. 6A. The perpendicular section 2 is designed to produce pulse 6B which when added to the pulse shown in Fig. 6A gives a net output pulse as illustrated in Fig. 6C corresponding to the original recording.

Referring again to Fig. 5 it will be noted that the center of the upper portion of the first or ring section 1 is raised a distance above the true center of the sections which are generally concentric with the axis of cathode ray tube T. This permits the recording medium to be centered between the perpendicular wing portions 11 and 14. Any arrangement which places the medium nearer to one of the wings 11 or 14 which constitute the perpendicular pole, results in undesirable response because the perpendicular section then responds to the longitudinal component of magnetization in such a manner that the net longitudinal pulse response shows end-for-end asymmetry which cannot be compensated readily by the perpendicular section. Therefore with this modification, section 1 is so disposed that tape 7 engages the surface of section 1 in the vicinity of the longitudinal gap 5, this circumstance automatically centering the tape with respect to wings 11 and 14.

Figure 7:
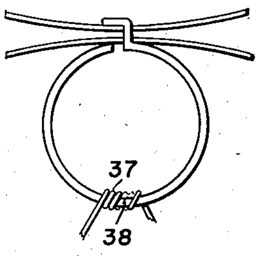
Fig. 7 illustrates a modified form of reproducing head.

In Fig. 7 there is illustrated still another modification of my invention. In this arrangement a coil 37 may be employed instead of the cathode ray tube T for conversion of magnetic flux to voltage. The lower portions of the C-shaped members 3, 4, 9 and 10, respectively, are extended to butt, as indicated by numeral 38, or lap at the bottom as viewed in Fig. 7 and a coil encircling these lower portions is then provided. In this arrangement zero frequency response cannot be obtained but the response falls at a rate of only 6 db per octave instead of 18 db per octave as is true for conventional ring type pick-ups at recorded wave lengths which are much greater than the physical length of the core.

Figure 9:
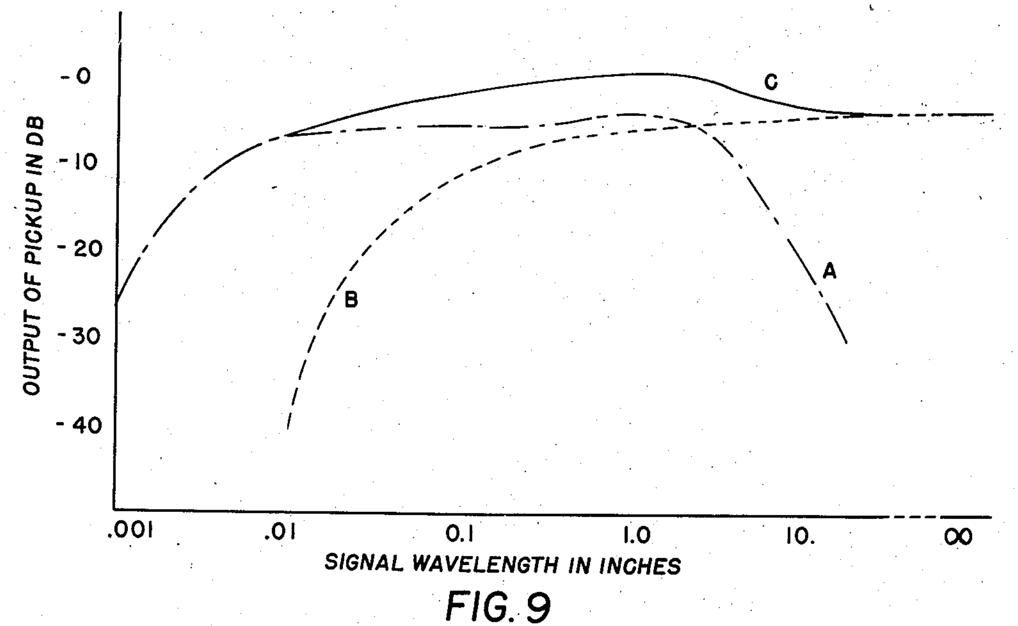
Fig. 9 shows frequency response curves useful in understanding my invention.

Consideration is now given to the application of the principles of my invention. Referring to Fig. 9, there is shown by means of curve A, a typical response to longitudinally recorded signals when reproduced with a longitudinal pick-up of the form shown in the previously mentioned co-pending application of Norman Cole and myself. It will be noted that curve A shows poor response at the higher wavelengths, i.e., low frequencies. Curve B shows a typical response to perpendicularly recorded signals reproduced with a perpendicular pick-up of the form shown in my co-pending application, Serial No. 394,929, filed November 30, 1953, and assigned to the same assignee as the present invention. It will be noted that curve B has excellent low frequency response down to zero cycles (infinite wavelength) but poor response at the higher frequencies, i.e., lower wavelengths. Curve C in Fig. 9 represents the response which would be obtained by combining (mixing additively) the two individual outputs represented by curves A and B.

Figure 10:
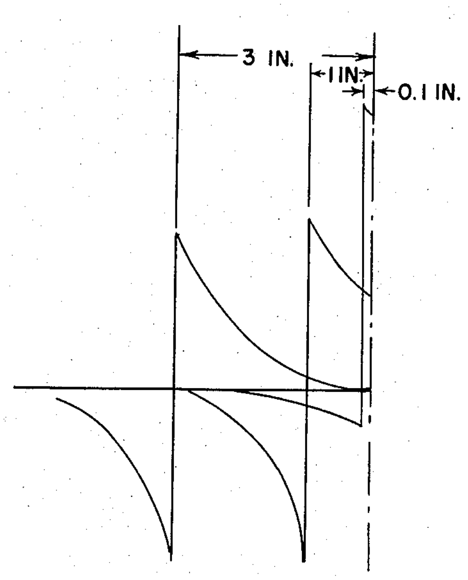
Figs. 6, 10 and 11 illustrate typical wave forms useful in understanding the operation of the head disclosed and claimed herein.
Figure 11:
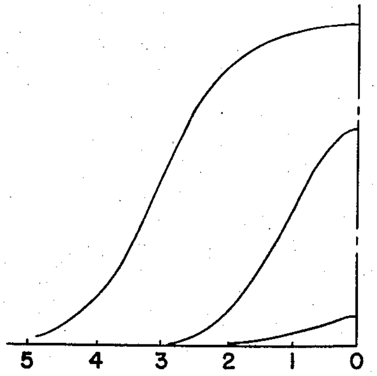

In order to determine the proper configuration for the pole pieces of the perpendicular core section disclosed herein for the purpose of further smoothing out the combined frequency response curve, it has been found helpful to consider the pulse response for pulses of several lengths. For example, Fig. 10 shows the pulse response of a longitudinal core to unipolarity rectangular pulses having lengths of 6, 2, and 0.2 inches, the outside diameter of the longitudinal core of being ¾″. The pulses, only half of which are shown in Fig. 10, are assumed to be symmetrical about the center line. The pulse response which the perpendicular core section must provide under each of these conditions is shown in Fig. 11, and is obtained by subtracting the waveforms of Fig. 10 from the desired rectangular pulse. The dimensions, the spacing between wings 11 and 14, and the amount of curvature of wing members 11 and 14 may be varied as necessary to obtain the desired response. Increased spacing between the pole pieces 11 and 14 provides a better match of the desired relative characteristics. If the spacing is doubled, for example, the flux induced in the poles by a narrow pulse, as for example a pulse having a length approximately equal to pole width, is appproximately halved. The flux induced by a pulse having a length of several inches, however, is decreased by a smaller percentage because the portion contributed by fringing flux remains essentially unaltered. Although the desired relative response shapes can be approximated to some degree if a long gap is used with narrow poles, the magnitude of the flux becomes very much smaller than that required to compensate for the response of the longitudinal section. It is then necessary to insert a high degree of wasteful attenuation in the longitudinal section to provide the required complementary response. Conversely, decreasing the pole width or the gap length provides a poorer match in relative response curve shapes.

By using long arcuate pole pieces as disclosed herein, two primary advantages are gained. First, the magnitude of the flux induced in the perpendicular type poles is greatly increased. Secondly, the addition of the third variable, the contour of the poles, permits better control over the relative response curve shapes and the desired curves may be approximated more closely.

Actual tests have shown that the long perpendicular pole pieces tend to shunt some of the flux which reaches the longitudinal pickup in the absence of the perpendicular section. This results in a somewhat higher low frequency cutoff from the longitudinal section and a process of successive approximations is required in arriving at a final design. However, it is believed that the foregoing discussions indicate clearly the principles involved and the general effect of variables to be considered in determining the configuration of the parts comprising the perpendicular pick-up section.

Referring again to Fig. 6, it should be noted that the longitudinal and perpendicular recorded components must be combined in proper polarity in order to obtain the over-all improvement discussed hereinbefore. For example, if the waveforms shown in 6A and 6B, respectively, are in such relative relationship that curve 6B subtracts from curve 6A instead of adds, it is believed obvious that the resultant waveform will be worse than represented by 6A. In order to accomplish the desired purpose, the upper and lower poles 14 and 11, respectively, are connected to the C-shaped members 9 and 10 in such a manner that the flux in the perpendicular section 2 is directed through the cathode ray tube T in the same direction as flux from the longitudinal section 1. Whether the upper pole 14 is connected to the right or to the left-hand C-shaped member depends upon the type of recording head and the direction of tape travel over the reproducing head.

If a combined recording head having both perpendicular and longitudinal recording sections is so arranged that a perpendicular component is directed upwardly when the longitudinal component is directed toward the right as would be viewed in a plan view with a combination reproducing head having the same orientation as the recording head, the upper pole in the perpendicular section would be coupled to the right-hand C-shaped member 10 so that flux from the perpendicular section flows into the tube T in the same direction as the flux from the longitudinal section. In a combination recording head as shown in the above-mentioned co-pending application Serial No. 403,128 and the same orientation of both heads, the perpendicular component would be directed downward when the longitudinal component is directed toward the right. In this latter case, the lower perpendicular section pole piece or wing 11 would be coupled to the right-hand C-shaped member 10. Reference has been made herein only to polarities when the recorded pulse is in or over the playback gaps. As shown in Fig. 6, before the longitudinal pulse reaches the gap, flux passes through the core in the oppsosite direction, and, if conditions are as described above, cancellation between the longitudinal and perpendicular components of flux is obtained.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. A reproducing head for use in magnetic recording apparatus having a first section comprising a ring type core responsive primarily to longitudinally recorded signals, a second section responsive primarily to perpendicularly recorded signals, said second section including means to shape the pulse response of said second section so that it complements the pulse response of said first section and a single translating means for converting induced magnetic signals of said first and second sections to a composite electrical signal.

2. Magnetic reproducing apparatus for reproducing signals from a magnetic medium having signals longitudinally and perpendicularly recorded thereon comprising a cathode ray tube adapted for translation of energy between magnetic flux and electric current, said tube having a pair of magnetic deflection pole pieces and means for transferring flux from said medium to said pole pieces comprising a first section having a ring type core responsive primarily to the longitudinally recorded signals and a second section responsive primarily to the perpendicularly recorded signals.

3. The magnetic reproducing apparatus of claim 2 in which said first section comprises a pair of members of substantial area closely engaging said tube, the ends of said members defining an air gap transverse to that portion of said medium which carries longitudinally recorded signals and said second section comprising a pair of members of substantial area closely engaging said tube adjacent said first section, the members of said second section having spaced-apart overlapping pole portions disposed on opposite sides of that part of said medium carrying the perpendicularly recorded signals.

4. The combination of claim 3 in which the pair of members comprising said first section are tapered, and the narrow ends of the tapered members define said air gap.

5. The combination of claim 3 in which each pole portion carries longitudinally extending magnetic members on either side of said medium.

6. The combination of claim 4 in which said longitudinally extending members gradually curve away from said medium.

7. The magnetic reproducing apparatus of claim 2 in which means is provided for centering the medium in the space between said pole portions.

8. The combination of claim 1 in which said second section comprises a pair of spaced-apart overlapping pole portions of substantial length disposed on opposite sides of that part of a medium which carries the perpendicularly recorded signals.

9. The combination of claim 8 in which said pole portions gradually curve away from said medium.

10. The combination of claim 1 in which said signal translating means comprises a coil inductively coupled to said first and second sections.

11. The combination of claim 1 in which said signal translating means comprises a cathode ray tube.

12. A reproducing head for use in magnetic recording apparatus having a first section comprising a ring type core responsive primarily to longitudinally recorded signals and a second section responding primarily to perpendicularly recorded signals, said second section comprising a pair of spaced-apart overlapping pole portions of substantial length disposed on opposite sides of that part of a medium which carries the perpendicularly recorded signals.

13. The combination of claim 12 in which said pole portions gradually curve away from said medium.

References Cited in the file of this patent

UNITED STATES PATENTS

| | | |
|---|---|---|
| 2,272,821 | Roys | Feb. 10, 1942 |
| 2,488,717 | Eilenberger | Nov. 22, 1949 |